United States Patent [19]

Evlanov

[11] Patent Number: 4,530,512
[45] Date of Patent: Jul. 23, 1985

[54] SUSPENSION OF A MOTOR VEHICLE

[75] Inventor: Viktor I. Evlanov, Moscow, U.S.S.R.

[73] Assignee: Avtomobilny Zavod Imeni Leninskogo Komsomola, Moscow, U.S.S.R.

[21] Appl. No.: 523,634

[22] Filed: Aug. 15, 1983

[51] Int. Cl.$^3$ .............................................. B62D 17/00
[52] U.S. Cl. ..................................... 280/661; 403/191
[58] Field of Search ............. 280/661, 673, 675, 668; 403/233, 191, 408, 409

[56] References Cited

U.S. PATENT DOCUMENTS

| | | | |
|---|---|---|---|
| 1,787,017 | 12/1930 | Paul | 403/191 |
| 3,917,308 | 11/1975 | Schulz | 280/661 |
| 4,194,760 | 3/1980 | Shiomi et al. | |
| 4,213,631 | 7/1980 | Wilkerson | |
| 4,252,338 | 2/1981 | Ingalls et al. | |
| 4,313,617 | 2/1982 | Muramatsu et al. | 280/661 |

FOREIGN PATENT DOCUMENTS 2450810  5/1975  Fed. Rep. of Germany ...... 403/191
2327609  2/1978  Fed. Rep. of Germany .

Primary Examiner—Joseph F. Peters, Jr.
Assistant Examiner—Ross Weaver
Attorney, Agent, or Firm—Ladas & Parry

[57] ABSTRACT

Suspension of a motor vehicle in which a mechanism for adjusting wheel camber is mounted on one of bolts connecting a steering knuckle to one of the links of a suspension guiding means. The mechanism for adjusting wheel camber has the form of a nut-screw kinematic pair defined by a threaded portion of the bolt passing through a bore in the steering knuckle and a nut secured on this bolt which nut is capable of translational motion during adjusting wheel camber and has parallel outer surfaces disposed at an angle to the axis of the threaded hole thereof. The bore in the steering knuckle is inclined at the same angle to a perpendicular passed through bearing surfaces for the bolt as the angle of the outer surfaces of the nut, this bore in the steering knuckle having in cross-section shape and dimension corresponding to the shape and dimensions of the nut.

2 Claims, 4 Drawing Figures

SUSPENSION OF A MOTOR VEHICLE

This invention relates to automobile engineering, and more particularly to suspension of motor vehicles.

The invention can find application in front wheel suspension wherein a suspension guiding means is provided with telescopic struts.

The invention can also be utilized for adjusting wheel camber in other types of suspensions, such as parallel arm type suspensions and trailing arm type suspensions.

The invention can further be used both in the front and rear wheel suspensions.

There is known suspension of a vehicle in which a steering knuckle is connected by bolts through a bracket to a telescopic strut which is one link of the suspension guiding means. Mounted on one of the bolts is a mechanism for adjusting wheel camber comprising two eccentric discs rigidly connected to the bolt and installed in slots of the telescopic strut bracket, the slots having flat parallel walls (cf., West German Pat. No. 2,327,609).

During wheel camber adjustment the contact of the outer round surface of the eccentric discs with the guide slots is effected along a straight line the length of which is determined by the thickness of the eccentric disc. As a result, considerable unit loads are produced in the zone of such contact.

Oval-shaped holes are provided in the bracket for relative displacement of the telescopic strut and the steering knuckle. The longer axis of the oval hole has a length determined by the sum of the bolt diameter and a double eccentricity of the eccentric disc. The provision of this hole may lead to slackening of the connection between the telescopic strut and the steering knuckle and, as a consequence, disturbing the wheel camber angle to result in faster tyre wear and affected steering stability of the motor vehicle.

It is an object of the present invention to provide a reliable connection of a mechanism ensuring a predetermined wheel camber angle in the course of extended vehicle operation to reduce the rate of tyre wear of the vehicle.

Another object of the invention is to maintain the vehicle's stability and steerability.

These and other objects and attending advantages are attained by that in suspension of a motor vehicle in which a mechanism for adjusting wheel camber is mounted on one of bolts connecting a steering knuckle to a link of a suspension guiding means, according to the invention, the mechanism for adjusting wheel camber is fashioned as a nut-screw kinematic pair defined by a threaded portion of a bolt passing through a bore in the steering knuckle and a nut secured on this bolt to be capable of translational motion during wheel camber adjustment and having parallel outer surfaces disposed at an angle to the axis of a threaded hole in this nut, the bore in the steering knuckle being disposed at the same angle to a perpendicular passed through bearing surfaces thereof for the bolt as the angle of inclination of the outer surfaces of the nut, this bore having in cross-section configuration and dimensions corresponding to those of the nut.

Preferably, the threaded hole in the nut is offset toward one of the outer surfaces of the nut arranged at an angle to the axis of this hole.

The aforedescribed arrangement of the nut affords to expand the angle of wheel camber adjustment at substantially the same size of the wheel camber adjustment mechanism.

The mechanism for adjusting wheel camber according to the invention, although being structurally simple, provides for a greatly improved durability of suspension through maintaining optimized camber angle. In addition, the mechanism allows to expand the range of camber angle adjustment.

The invention will now be described in greater detail with reference to a specific embodiment thereof taken in conjunction with the accompanying drawings, in which.

Figure 1:
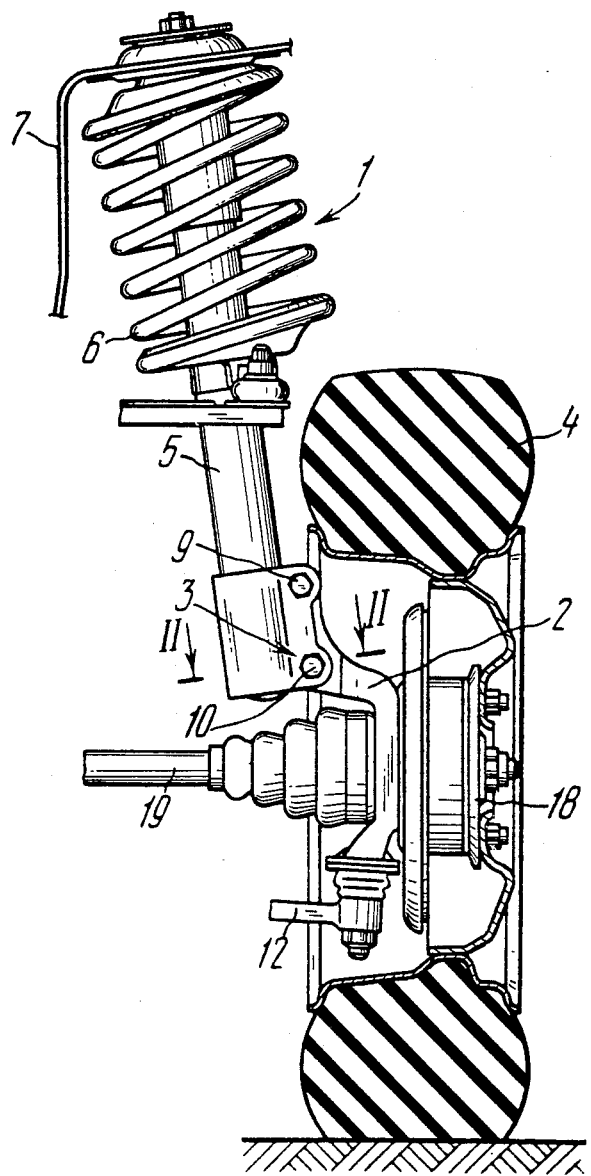
FIG. 1 is a general view of suspension of a motor vehicle according to the invention.
Figure 2:
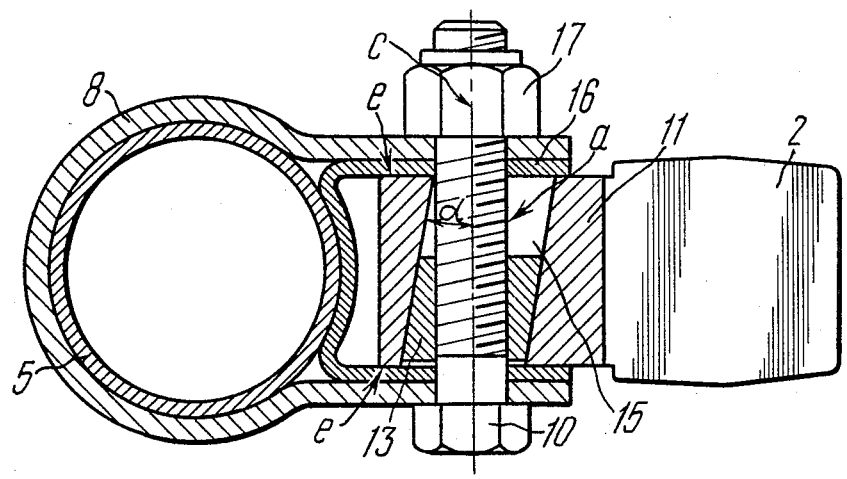
FIG. 2 is a section taken along the line II—II in FIG. 1, an enlarged view.

Suspension of a motor vehicle, in this case front wheel suspension, comprises a guide means indicates by 1 (FIG. 1), a steering knuckle 2, and a mechanism 3 for adjusting camber of wheels 4. A telescopic suspension strut 5, which is one of the links of the guide means 1, is spring-biased by a spring 6 and is rigidly connected by one end thereof to a body 7 of the vehicle. The other end of the strut 5 is connected to a boss 11 (FIG. 2) of the steering knuckle 2 by way of bracket 8 (FIG. 2), bolt 9 (FIG. 1) and bolt 10.

The other end of the steering knuckle 2 is pivotally connected to the vehicle's body (not shown) through an arm 12 (FIG. 1) which is another link of the guide means.

Figure 4:
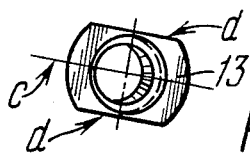
FIG. 4 is a view taken along the arrow "A" in FIG. 3.
Figure 3:
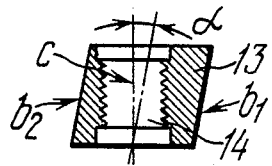
FIG. 3 is a longitudinal sectional view of a nut.

The mechanism for adjusting wheel camber is fashioned as a nut-screw kinematic pair defined by the bolt 10 (FIG. 2) having threads at its portion "a" passing through the boss 11, this portion of the bolt functioning as the screw of the kinematic pair. A nut 13 having a threaded hole 14 (FIG. 3) is disposed at the portion "a" of the bolt 10, this nut 13 having parallel cylindrical sections "$b_1$" and "$b_2$" at the outer surface arranged on its opposite sides at an angle "$\alpha$" to the axis "c" which is the longitudinal centerline of the threaded hole 14. For preventing the nut 13 from rotation during its travel (such as during camber adjustment) sides "d" thereof (FIG. 4) have cuts parallel with the axis "c".

For accommodating the nut 13 (FIG. 2) and bolt 10 in the boss 11 a through bore 15 is provided in the boss 11. In cross-section this bore 15 has the shape and dimensions conforming to the shape and dimensions of the nut 13. The through bore 15 is at an angle "$\alpha$" to a perpendicular passed through the surface "e" of the boss 11 serving as a bearing surface for the bolt 10. A self-locking nut 17 is used for tightening the connection of the bracket 8 and boss 11 through a flange 16. The steering knuckle 2 has mounted thereon a wheel hub 18 with a half-axle 19.

For expanding the range of adjustment of the wheel camber angle the threaded hole 14 (FIG. 3) is offset in the nut 13 toward the surface "$b_2$".

The suspension according to the invention operates as follows.

When camber of the wheels 4 is to be adjusted, the two nuts 17 on the bolts 10 and 9 must be slackened. Then, by turning the bolt 10 camber adjustment is executed by virtue of transforming rotational motion of the bolt 10 into translational motion of the nut 13, which moves on the threads of the bolt 10 at the portion "a"

and in the bore 15 inclined at the angle "α" to thereby change the relative position of the boss 11 and bolt 10. Therewith, the steering knuckle 2 tends to turn about the axis of the bolt 9 whereby the wheel 4 is displaced relative to the telescopic strut 5.

After wheel camber is adjusted, the threaded connection is tightened by turning the nut 17.

The suspension of a motor vehicle provided with a mechanism for adjusting wheel camber embodying the features of the present invention has been tested on pilot car models. The test run covered close to 150 thousand kilometers of highways and roads without any signs of displacement of the steering knuckle relative to the telescopic strut.

What is claimed is:

1. Suspension of a motor vehicle comprising: a steering knuckle connected to a wheel of the motor vehicle; a suspension guiding means having links connecting said steering knuckle to the body of said motor vehicle; bolts connecting one of said links to said steering knuckle; bores in said steering knuckle for the passage of said bolts therethrough; a mechanism for adjusting camber of said wheels in the form of a nut-screw kinematic pair secured on one of said bolts with the screw defined by a thread on a portion of one of said bolts passing through one of said bores of said steering knuckle and the nut mounted on said screw for translational motion during adjusting wheel camber, the nut having parallel outer surfaces arranged at an angle to the axis of its threaded hole; one of said holes in said steering knuckle being arranged at an angle to a perpendicular passed through its bearing surfaces for one of said bolts, this angle corresponding to the inclination angle of the parallel outer surfaces of said nut to its axis, this bore in said steering knuckle having in cross-section configuration and dimensions corresponding to the shape and dimensions of said nut.

2. A suspension as defined in claim 1 in which the threaded hole in the nut is offset toward one of said outer surfaces of said nut arranged at an angle to the axis of the threaded hole.

* * * * *